United States Patent [19]

Tucker

[11] 4,014,002
[45] Mar. 22, 1977

[54] DATA ACQUISITION AND TRANSFER SYSTEM

[75] Inventor: John F. Tucker, San Diego, Calif.

[73] Assignee: The United States of America as represented by the Secretary of the Navy, Washington, D.C.

[22] Filed: Apr. 5, 1976

[21] Appl. No.: 673,830

[52] U.S. Cl. .............................. 340/168 B; 328/74; 340/167 A; 178/69.1

[51] Int. Cl.² ..................... H04L 7/00; H03K 7/08; H03K 9/08; H04Q 9/00

[58] Field of Search ..... 340/168 B, 147 SY, 167 A; 178/69.5 R, 69.5 DC; 179/15 BS; 307/265; 328/61, 63, 74

[56] References Cited

UNITED STATES PATENTS

| 3,268,824 | 8/1966 | Hinrichs et al. ................. 328/74 X |
| 3,601,537 | 8/1971 | Gueldenpfenning et al. ... 178/69.5 R |
| 3,622,807 | 11/1971 | Gillet et al. ....................... 328/74 X |
| 3,894,246 | 7/1075 | Torgrim ..................... 178/69.5 R X |
| 3,953,674 | 4/1976 | Fletcher et al. .............. 178/69.5 R |
| 3,967,061 | 6/1976 | Dobias .......................... 178/69.5 R |
| 3,967,062 | 6/1976 | Dobias .......................... 178/69.5 R |
| 3,983,325 | 9/1976 | Ollinger et al. ............... 178/69.5 R |

Primary Examiner—Donald J. Yusko
Attorney, Agent, or Firm—R. S. Sciascia; G. J. Rubens; T. M. Phillips

[57] ABSTRACT

A self-clocking binary data acquisition and transfer system in which each bit of any data stream is divided into four time periods such that both 0 and 1 data bits are high during the first time period and a 0 will go low after the first time period and a 1 will be low after the third time period. The first, second and third time periods are used for transmission of information and the fourth for initialization.

9 Claims, 4 Drawing Figures

DATA ACQUISITION AND TRANSFER SYSTEM

BACKGROUND OF THE INVENTION

The present invention relates to a digital data communication system and more particularly to a digital data communication system using a self-clocking technique for transmitting and receiving data over a single coaxial cable.

SUMMARY OF THE INVENTION

The present invention provides for a self-clocking asynchronous digital data communication system wherein each bit of any data stream is divided into four time periods. The incoming data is converted from parallel to serial data and by means of the four time periods and logic circuitry the data is coded along with the clock signal to provide a self-clocking continuous stream of data which can be received and decoded at a remote receiver.

Accordingly, an object of the present invention is the provision of a data acquisition and transfer system wherein transmitters may send data of any work length.

Another object of the invention is the provision of a data acquisition and transfer system wherein only one transmission line is required for each remote transmitter.

Another object of the invention is the provision of a data acquisition and transfer system wherein the receiver can accept any word length although different from any of a plurality of transmitter.

Still another object of the invention is to provide a data acquisition and transfer system wherein the system is completely automatic requiring no manual operation.

Other objects and many of the attendant advantages of this invention will be readily appreciated as the same becomes better understood by reference to the following detailed description when considered in connection with the accompanying drawings

DESCRIPTION OF THE PREFERRED EMBODIMENTS

Figure 1:
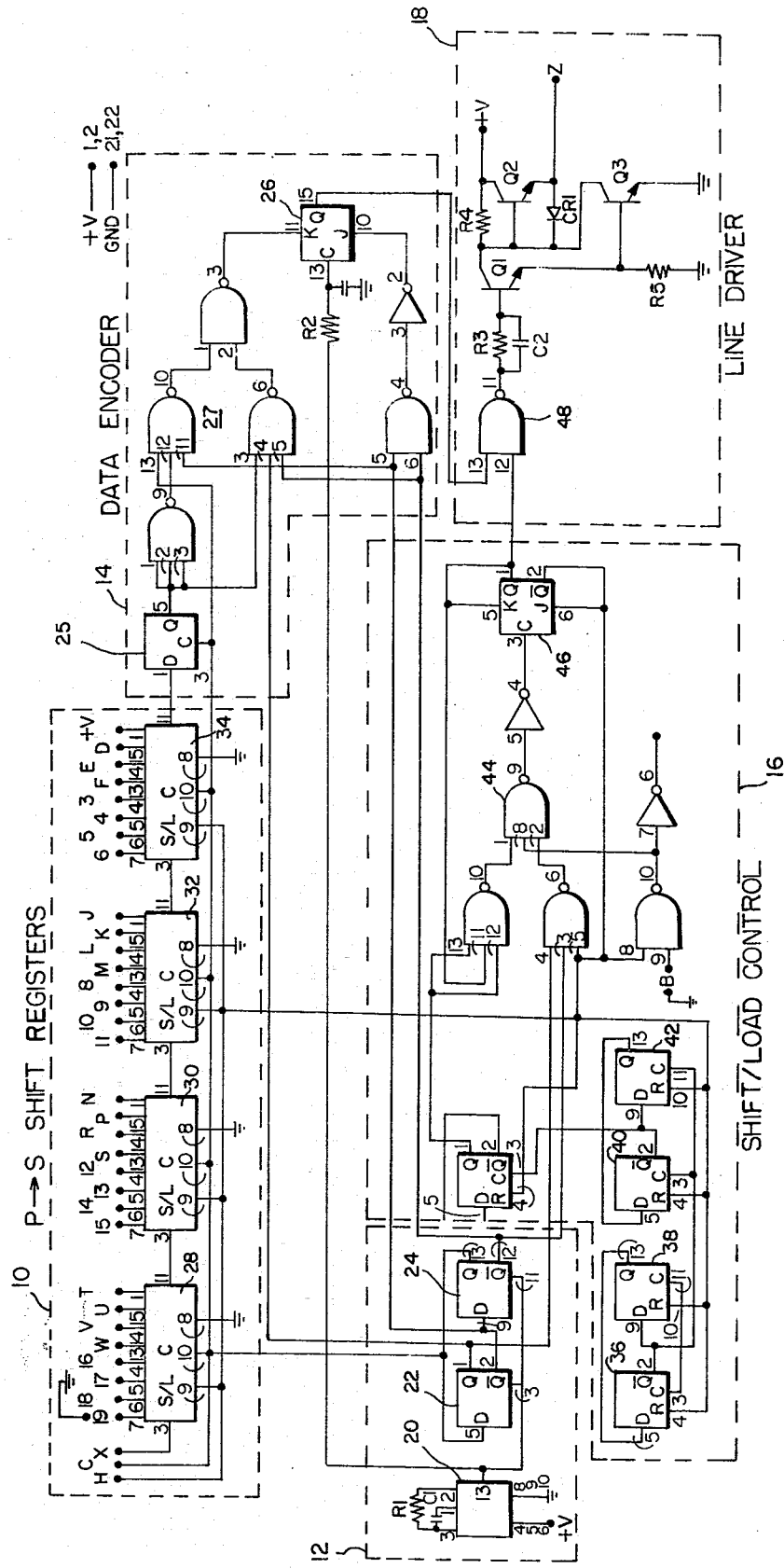
FIG. 1 is a schematic diagram of the transmitter for the data communication system.

Referring now to FIG. 1 wherein is shown in schematic diagram form a transmitter for the data communication system. Data is received in parallel form in parallel to serial register 10. The data is clocked out of parallel to serial shift registers 10 in serial form to data encoder 14 by means of clocking circuit 12 and shift load control 16. At the end of a data word, shift load control 16 disables the data outputs and prevents data transmission until a new data word is loaded into parallel to serial register 10. The encoded data is loaded into line driver 18 for transmission to the receiver.

Figure 4:
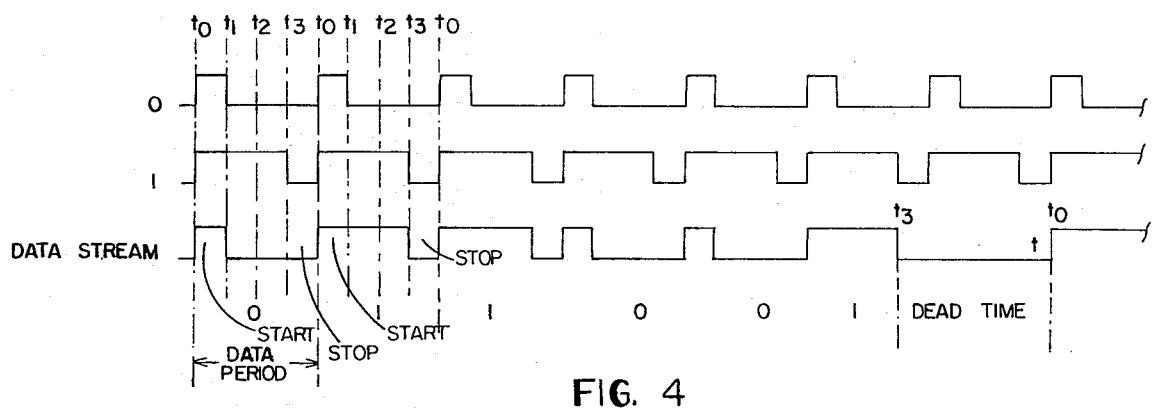
FIG. 4 shows the transmit and receive timing signals.

Clock oscillator 20 provides a series of clock pulses that are fed to flip-flops 22 and 24 which are connected to provide the four timing pulses (shown in FIG. 4). Flip-flops 22 and 24 provide output sequence for control timing as follows:

|  | Flip-flop 22 | Flip-flop 24 |
| --- | --- | --- |
| $t_0$ | 0 | 0 |
| $t_1$ | 0 | 1 |
| $t_2$ | 1 | 1 |
| $t_3$ | 1 | 0 |

At time $t_0$, control flip-flop 26 is set, generating a high level which is required at the start of each bit time. The serial output of parallel to serial shift registers 28, 30, 32 and 34, is shifted to the right and the first bit of register 34 is gated into flip-flop 25 by time pulse $t_0$. Data encoder gate 27 will set the input condition so that flip-flop 26 will be reset at $t_1$ if the data is a "0" or reset at $t_3$ if the data is a "1". Control flip-flop 26 is therefore reset in either case at time $t_3$ and generates a low level which is required at the stop of each bit time period. The time $t_0$ signal is used to shift the data through parallel to serial shift register 10 so that the next bit is ready for control gate 27 function.

In the illustrated embodiment shown, a counter (flip-flops 36, 38, 40, and 42) counts data bits until the count equals the number of bits in the data word. At this time a high appears at the output of gate 44 which enables flip-flop 46 to toggle providing a disabling gate to data output gate 48. Data output gate 48 will remain disabled until the next time $t_0$, thus allowing a low level output for one bit period ($t_0$–$t_3$) as an end of work indication. During this period of "dead time" the parallel to serial register 10 is placed in the parallel load mode and the rise of the time $t_0$ signal loads a new data word.

Transmission of data is continuous as the shifting process repeats, producing a stream of self-clocked data words with a one data period of space between each word.

Figure 3:
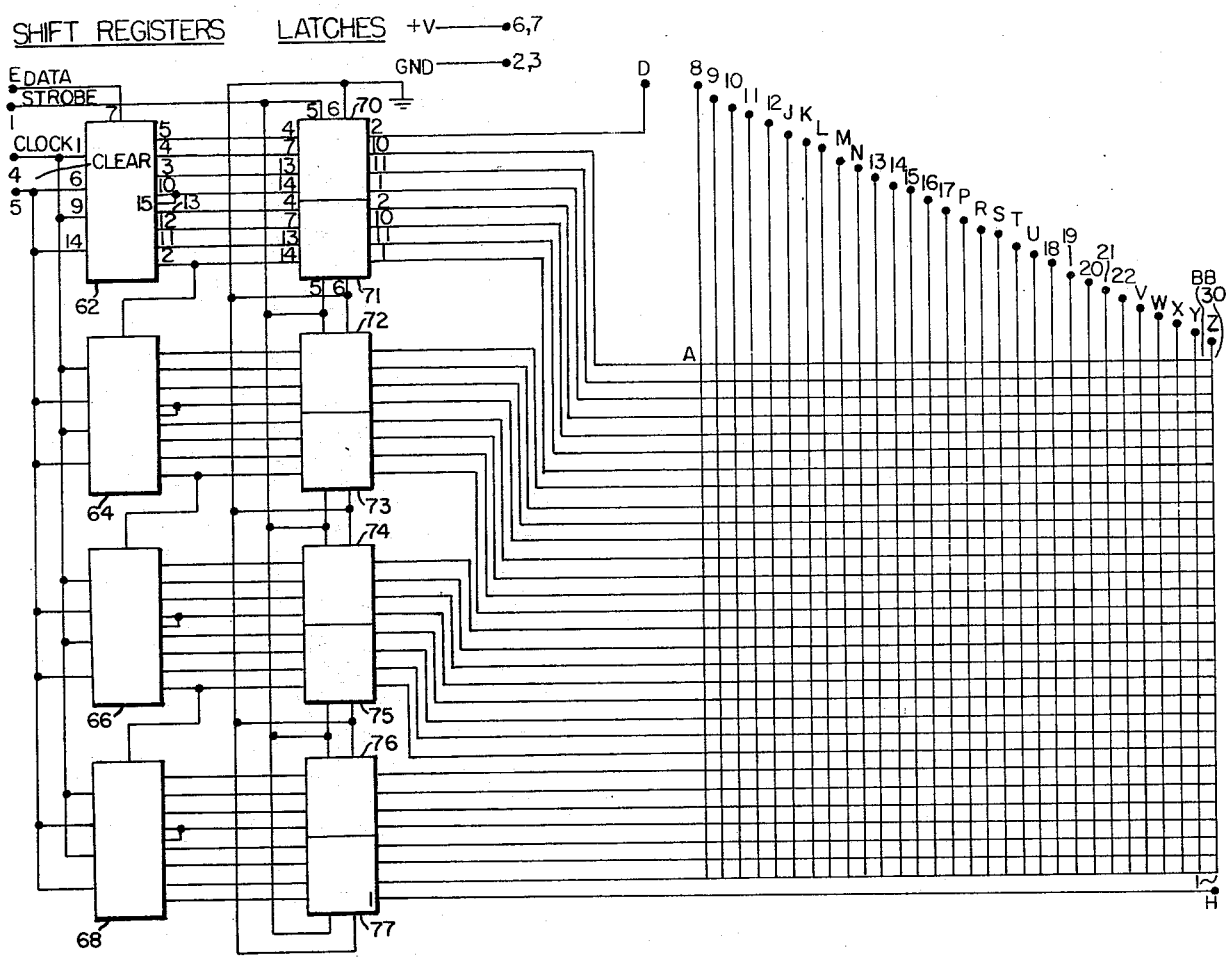
FIG. 3 is a schematic diagram of the distribution system for the data communication system.

As shown in FIG. 4 each bit of the data stream is divided into four time periods labeled $t_0$ through $t_3$. The upper two waveforms labeled "0 data bits" and "1 data bits", respectively. As shown the signal is high at time $t_0$ and low at time $t_3$ for both "0" and "1" bits. These time periods are used for bit synchronization, but not for transmission of data. Time periods $t_1$ to $t_2$ carry data bit information. The level that exists on the tramsmission line at the start of the time period $t_2$ carry data bit information. The level that exists on the transmission line at the start of time period $t_2$, the mid-point of the data bit time, is strobed into the receiving shift register (FIG. 3). The data bit stream shown by the bottom waveform indicates that in its series of "0" and "1" data bits can be transmitted with each bit start indicated by a high transition and stop indicated by low transition with the data itself midway between.

Figure 2:
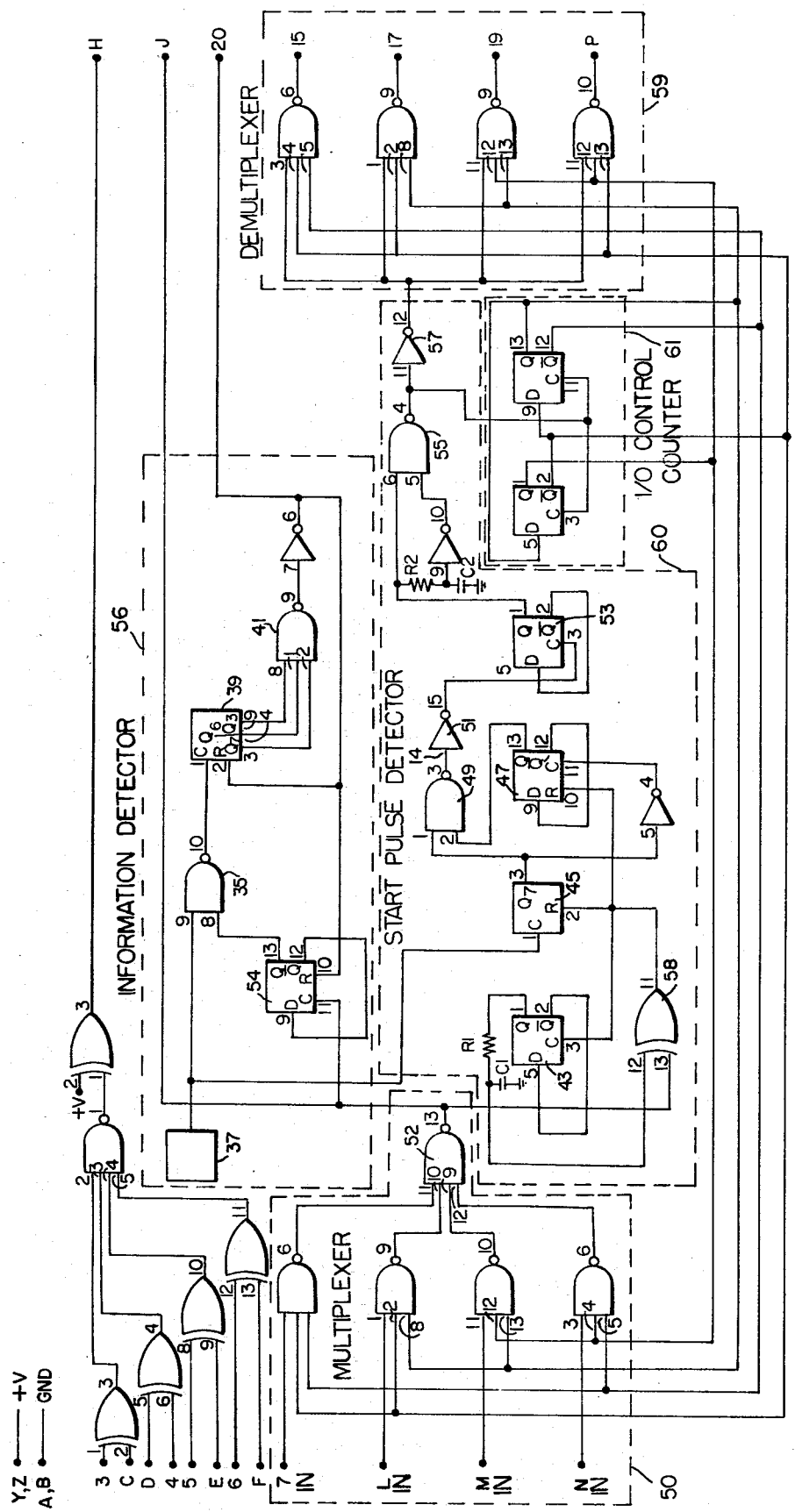
FIG. 2 is a schematic diagram of the receiver for the data communication system.

The signal out of line driver 18 (FIG. 1) at terminal Z is fed to one input of the multiplexer 50 of the receiver shown in FIG. 2. One receiver is required for each central location. The number of remote transmitters will determine the number of inputs required to multiplexer 50. In the embodiment shown there are four inputs labeled 7, L, M, and N. The serial data received from the transmitters terminate at the inputs to multiplexer 50. The output signal from multiplexer 50 depends upon the address of the data coming in. The output from multiplexer gate 52 is fed straight through to output terminal J, to flip-flop 54 of information detector 56 and to gate 58 of start pulse detector 60. The data fed to output terminal J is fed directly to the serial shift registers 62 through 68 (FIG. 3) where it is converted from serial to parallel information. Information detector 56 is for determining the center of the bit pulse for providing the clocking signal to the serial registers (62–68) of FIG. 3. Detector circuit 56 is enabled when the time pulse $t_0$ of the incoming bit pulse is received at flip-flop 54. Gate 35 is enabled and allows a stream of clock pulses from free-running clock 37 to counter 39. The count of one-half of the bit pulse is decoded in gate 41 and fed to the clock input terminals of shift registers 62 through 68 (FIG. 3). This enters the data that is at the input of register 62 and also shifts the stored memory (shift registers 62-68) by one place. This clock pulse also resets flip-flop 54 and detector 56 then waits for another $t_0$.

The purpose of start pulse detector 60 is to determine when a valid word is located in the shift register that is being addressed (FIG. 3). The incoming data from multiplexer 50 is differentiated by means of flip-flop 43 and an exclusive OR gate 58 to produce a pulse that occurs when the data changes state which is set at $t_0$ and $t_1$ or $t_3$ or during normal data transmission, the time between these pulses always resets counter 45 before it reaches a preset count. This count determines when a start pulse has occurred. When the time between two pulses is long compared to the time required to count to the preset number, a start pulse has occurred and the next bit after this start pulse is the first bit of the word. Therefore the next start pulse detected will indicate a valid word is present in the shift register and is ready to be loaded into the latches (70 through 76) FIG. 3. When an output occurs at counter 45, this is the indication of a start pulse. This indication is fed to the circuitry that will give an output pulse when the second start pulse is received for each word. The logic function is performed by flip-flop 47, gate 49, inverter 51, flip-flop 53, gate 55, and inverter 57 with the output at inverter 57. The output pulse from inverter 57 is fed to the multiplexer 59 to the correct set of latches shown in FIG. 3 for storage. Multiplexer 50 and demultiplexer 59 are addressed by the input-output control counter 61 and is incremented by 1 for every output of the start pulse detector. In this example there are four addresses.

In the embodiment shown the system provides for four transmitters, one receiver, and four shift registers and latches. There can be more or less transmitters by expanding or detecting the circuitry of the input-output central in the receiver, multiplexer and demultiplexer.

The transmitter samples data (1s or 0s) at their own rate. There is no synchronization between any transmitter. The self-clocking code is sent by coaxial cable, twister pair or fiber optics to the receiver.

The receiver samples each transmitter word separately until a full word is received and sent to the proper latches for storage. All shift registers receive the same information, only the latches associated with the transmitter selected by the input-output control are strobed for storage. Therefore the latches store the information in the same format that was received at the input to the transmitter.

Obviously many modifications and variations of the present invention are possible in the light of the above teachings. It is therefore to be understood that within the scope of the appended claims the invention may be practiced otherwise than as specifically described.

What is claimed is:

1. A data communication system for serially transferring binary data between a first and second location comprising:
   a. parallel to serial shift registers for receiving data in parallel form,
   b. timing control circuit means for generating a sequence of timing signals,
   c. data encoder circuit means coupled to the output of said parallel to serial shift registers and to said timing control circuit means for encoding data as a binary zero if the transition from a low to a high to a low is one clock pulse width in time and a binary one if the transition from a low to a high to a low is three clock pulse width in time,
   d. receiver circuit means for receiving said encoded data and having start pulse detector means for detecting the beginning of a data word and information detector means for detecting the presence of data.

2. The system of claim 1 and further comprising counter circuit means for counting the number of bits and providing a gate signal at a predetermined count to prevent data transmission for four clock pulses indicating the ending and starting of a data word.

3. The system of claim 2 wherein said start pulse detector means is responsive to the absence of a signal transition for four clock pulses for generating a start of data word signal.

4. The system of claim 2 wherein said information detector is responsive to a transition from low to high to initiate a counter to determine the middle of a data word.

5. The system of claim 4 wherein said encoded data is fed to a data transmission gate which allows data to be transmitted except for the four clock pulse period indicating the ending and starting of a data word.

6. The system of claim 5 wherein said start pulse detector includes a counter which is always reset before it reaches a preset count where there is a transition during a time duration of three clock pulses or less.

7. The system of claim 6 wherein said receiver includes shift registers and latches for receiving the detected data and storing only when indicated as the data transmitted.

8. The system of claim 7 wherein said start pulse detector determines when a start pulse has occurred and indicates a valid word is present in the shift register.

9. The system of claim 8 wherein said information detector provides a clocking pulse to said shift registers to shift indicated valid data to said latches for storage.

* * * * *